(12) United States Patent
Lee et al.

(10) Patent No.: US 10,630,412 B2
(45) Date of Patent: Apr. 21, 2020

(54) METHOD FOR TRANSMITTING A PRACH PREAMBLE IN A WIRELESS COMMUNICATION AND APPARATUS THEREFOR

(71) Applicant: LG ELECTRONICS INC., Seoul (KR)

(72) Inventors: Jeongsu Lee, Seoul (KR); Hyunsoo Ko, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 15 days.

(21) Appl. No.: 16/105,856

(22) Filed: Aug. 20, 2018

(65) Prior Publication Data

US 2019/0074922 A1 Mar. 7, 2019

Related U.S. Application Data

(60) Provisional application No. 62/547,774, filed on Aug. 19, 2017.

(51) Int. Cl.
| | |
|---|---|
| *H04J 13/00* | (2011.01) |
| *H04L 27/26* | (2006.01) |
| *H04W 72/04* | (2009.01) |
| *H04W 74/00* | (2009.01) |
| *H04W 74/08* | (2009.01) |
| *H04L 5/00* | (2006.01) |

(52) U.S. Cl.
CPC ...... *H04J 13/0062* (2013.01); *H04L 27/2607* (2013.01); *H04L 27/2613* (2013.01); *H04W 72/0446* (2013.01); *H04W 72/0453* (2013.01); *H04W 74/004* (2013.01); *H04W 74/0833* (2013.01); *H04L 5/0007* (2013.01)

(58) Field of Classification Search
CPC ............. H04L 27/2613; H04L 27/2607; H04L 5/0007; H04J 13/0062; H04W 72/0453; H04W 72/0446; H04W 74/004; H04W 74/0833

See application file for complete search history.

(56) References Cited

U.S. PATENT DOCUMENTS

| | | | | |
|---|---|---|---|---|
| 2010/0074372 A1* | 3/2010 | Mauritz | .............. | H04J 13/0055 375/319 |
| 2015/0282215 A1* | 10/2015 | Eriksson | ........... | H04W 74/0833 370/329 |
| 2016/0366703 A1* | 12/2016 | Eriksson | ........... | H04W 56/0005 |
| 2017/0055297 A1* | 2/2017 | Da | ...................... | H04J 13/0062 13/62 |
| 2017/0094686 A1* | 3/2017 | Ramamurthi | ..... | H04W 72/0406 |
| 2019/0150190 A1* | 5/2019 | Kim | ...................... | H04W 74/08 370/329 |
| 2019/0274172 A1* | 9/2019 | Yoon | ................... | H04W 74/006 |

* cited by examiner

*Primary Examiner* — Maharishi V Khirodhar
*Assistant Examiner* — Kenneth P Hunt
(74) *Attorney, Agent, or Firm* — Lee Hong Degerman Kang Waimey

(57) ABSTRACT

Provided is a method for transmitting a physical random access channel (PRACH) preamble in a wireless communication system. More specifically, the method performed by the UE includes generating a PRACH preamble sequence having a zero correlation zone (ZCZ) having a specific length based on a specific number-th root Zadoff-Chu sequence and a cyclic shift; and transmitting to a base station the PRACH preamble including the generated PRACH preamble sequence.

9 Claims, 12 Drawing Sheets

[FIG. 1]
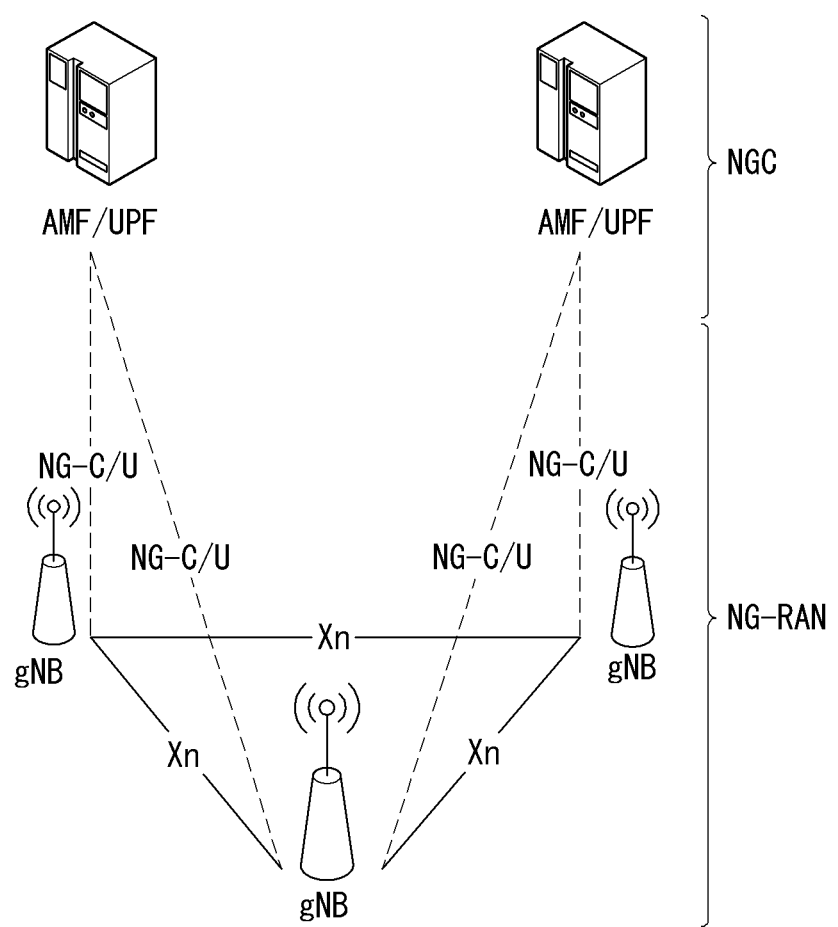

[FIG. 2]
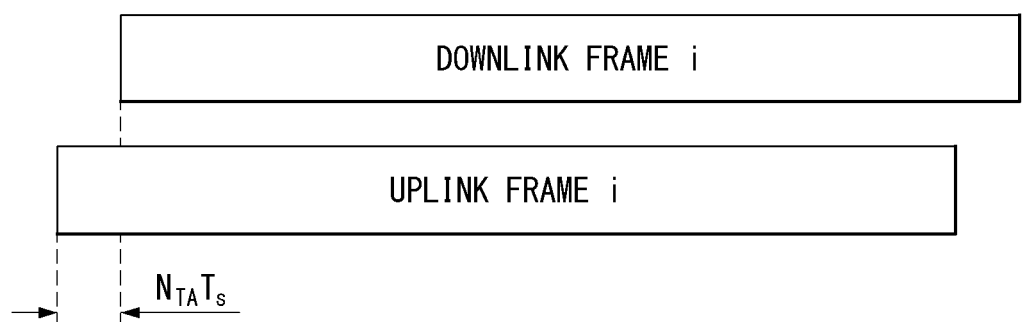

[FIG. 3]
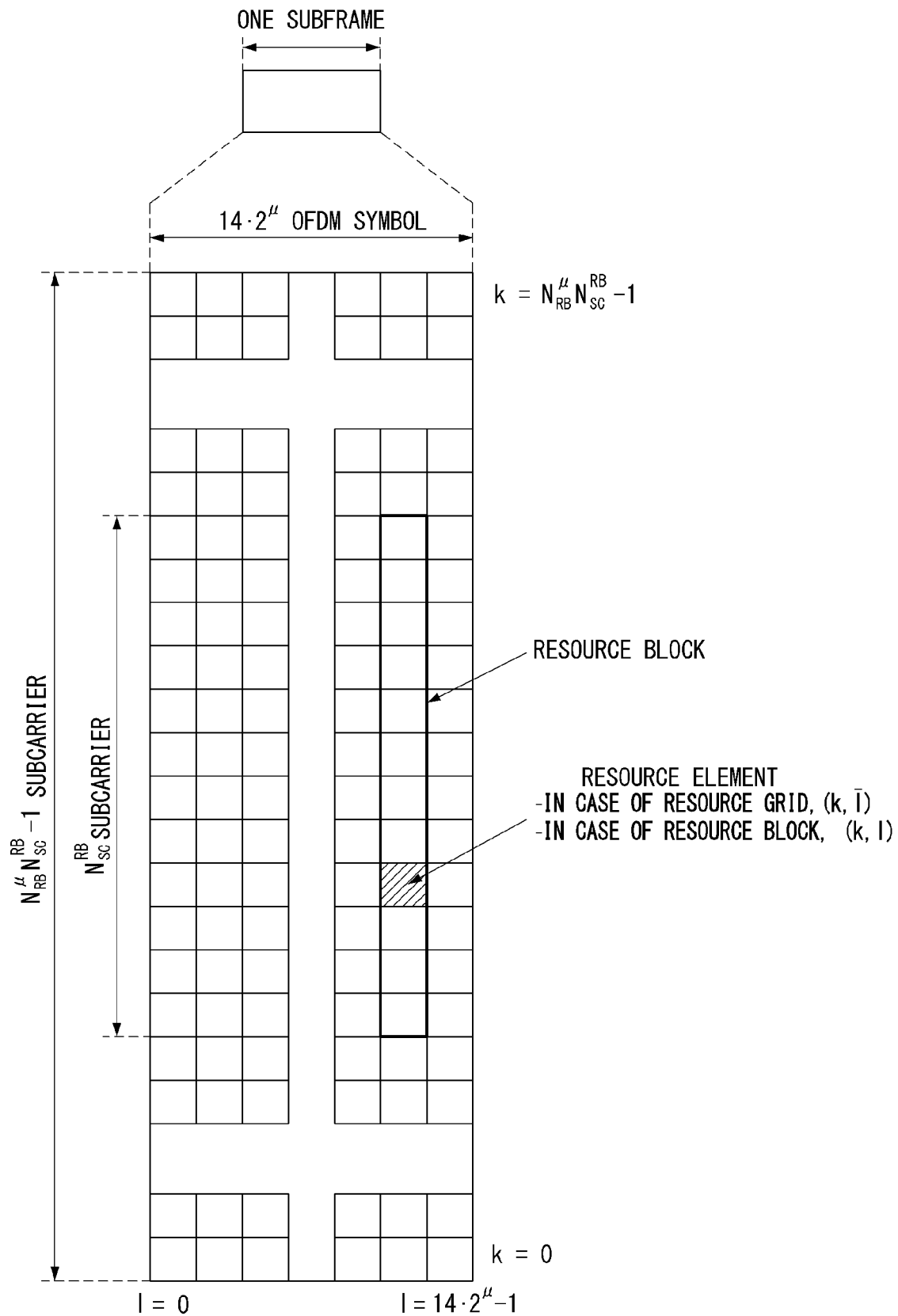

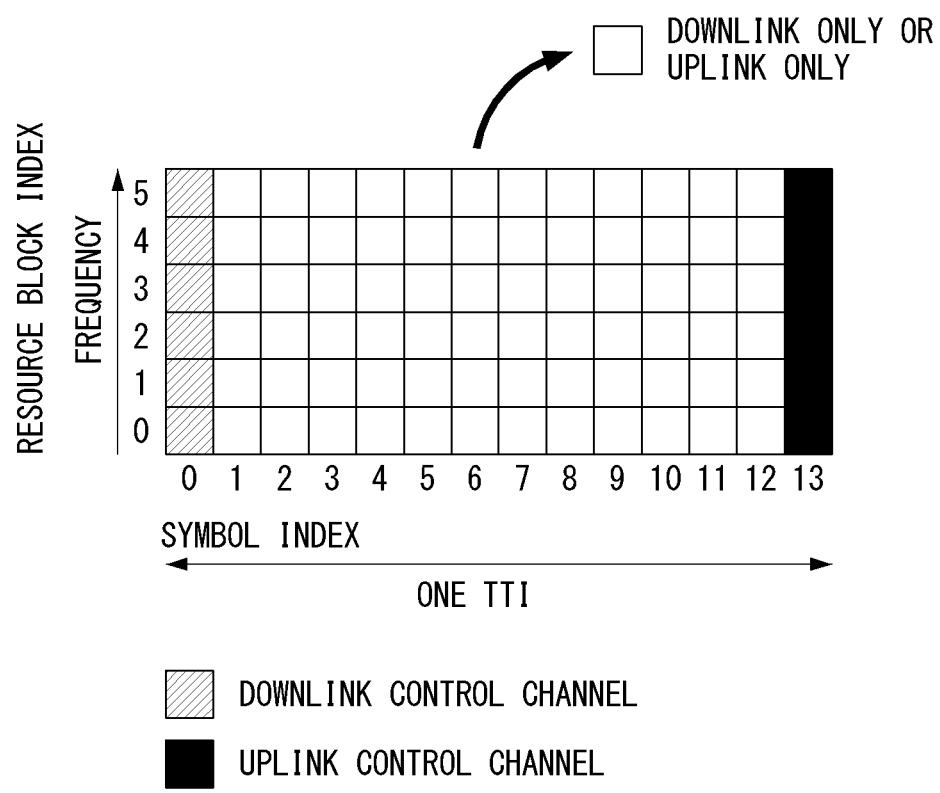
[FIG. 4]

[FIG. 5]
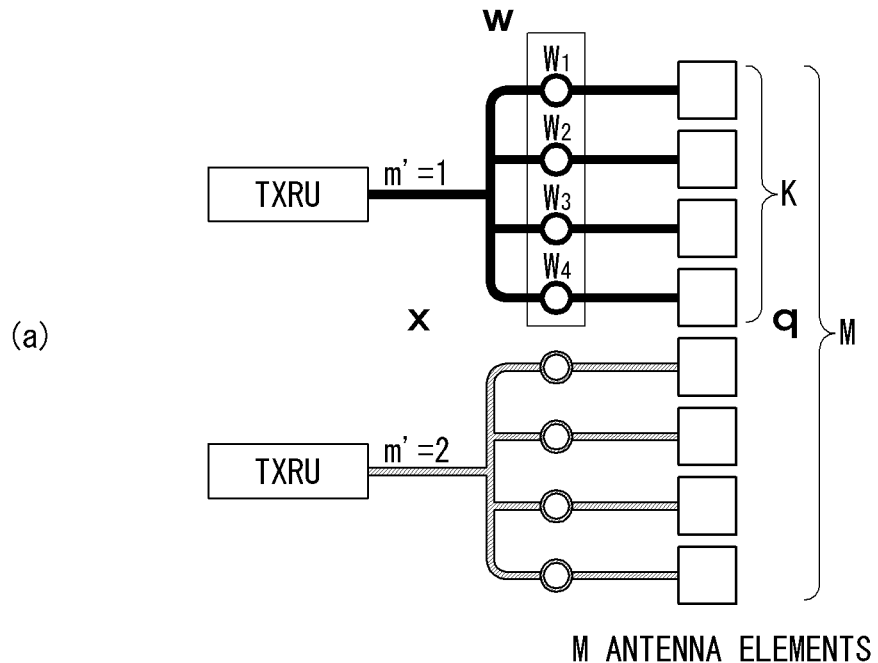
(a)
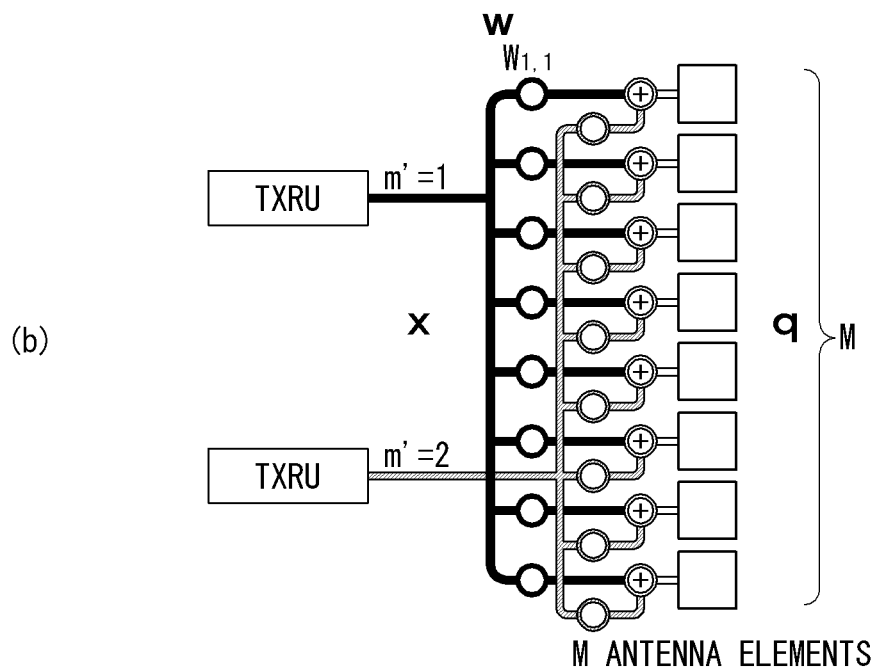
(b)

[FIG. 6]
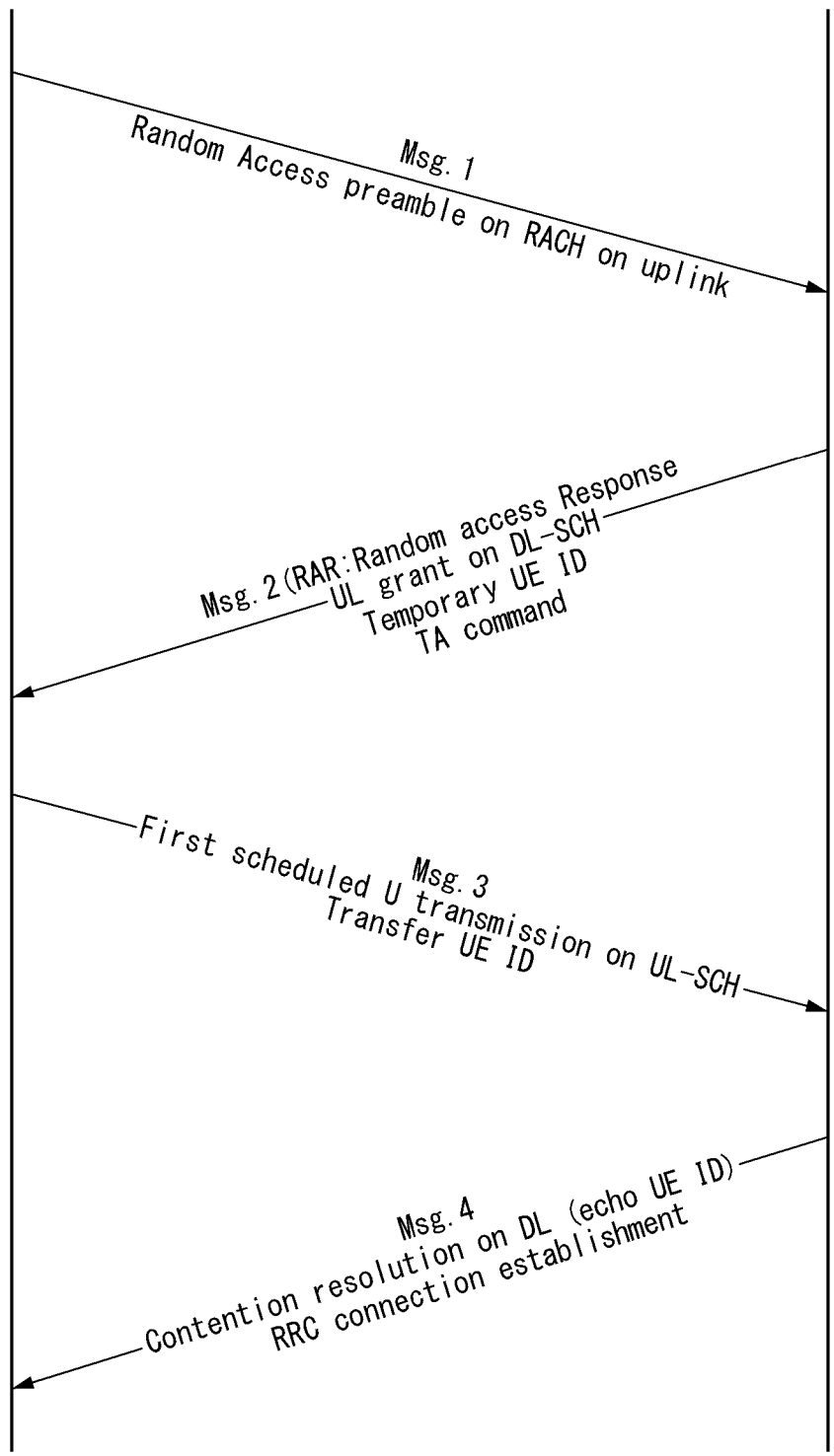

[FIG. 7]
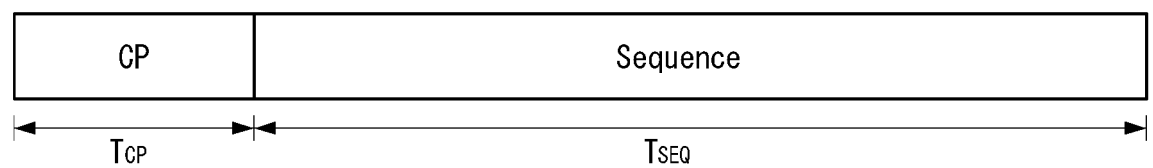

[FIG. 8]
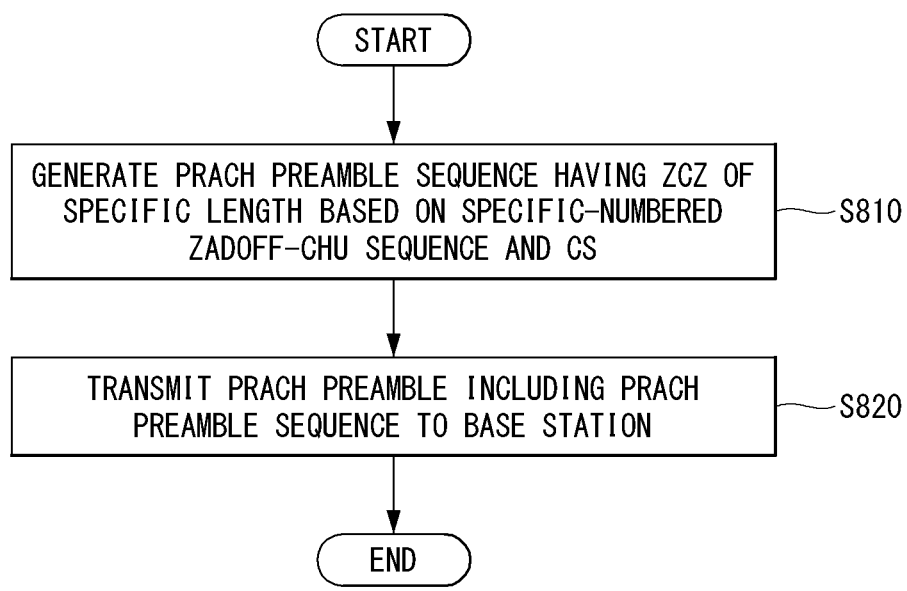

[FIG. 9]
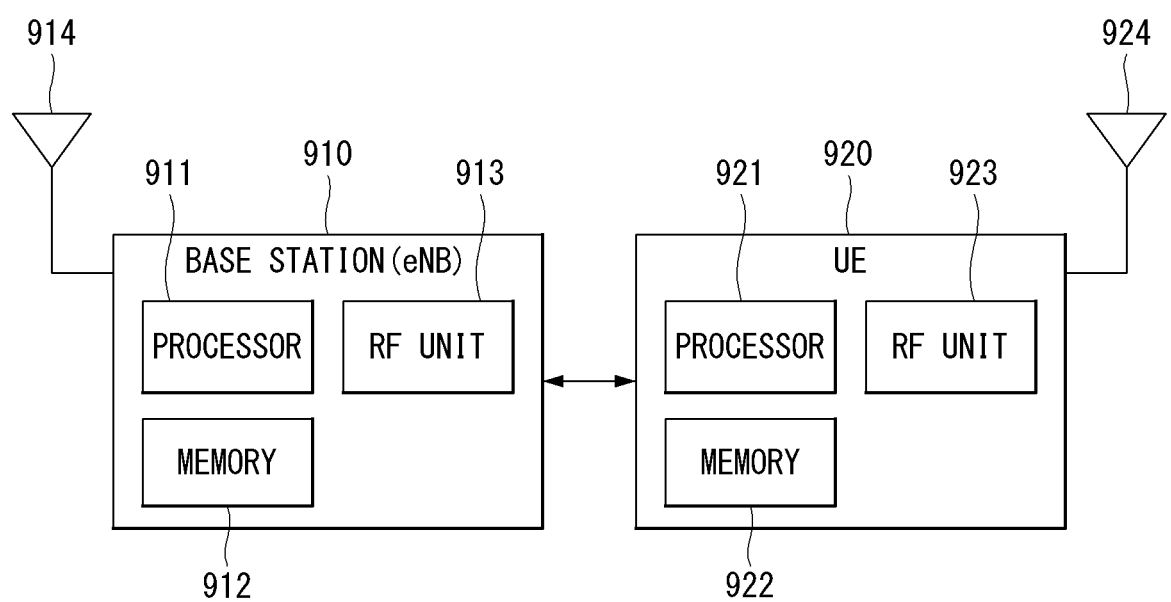

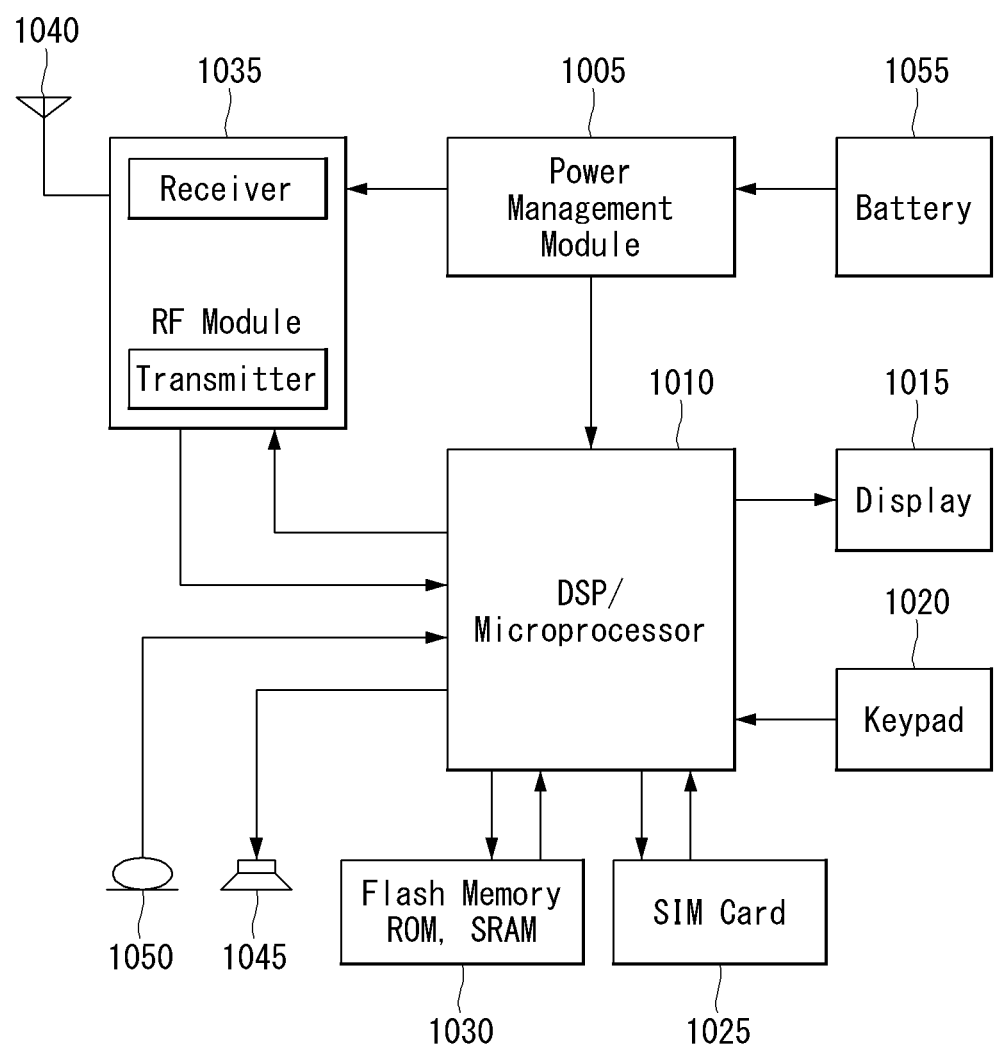
[FIG. 10]

[FIG. 11]
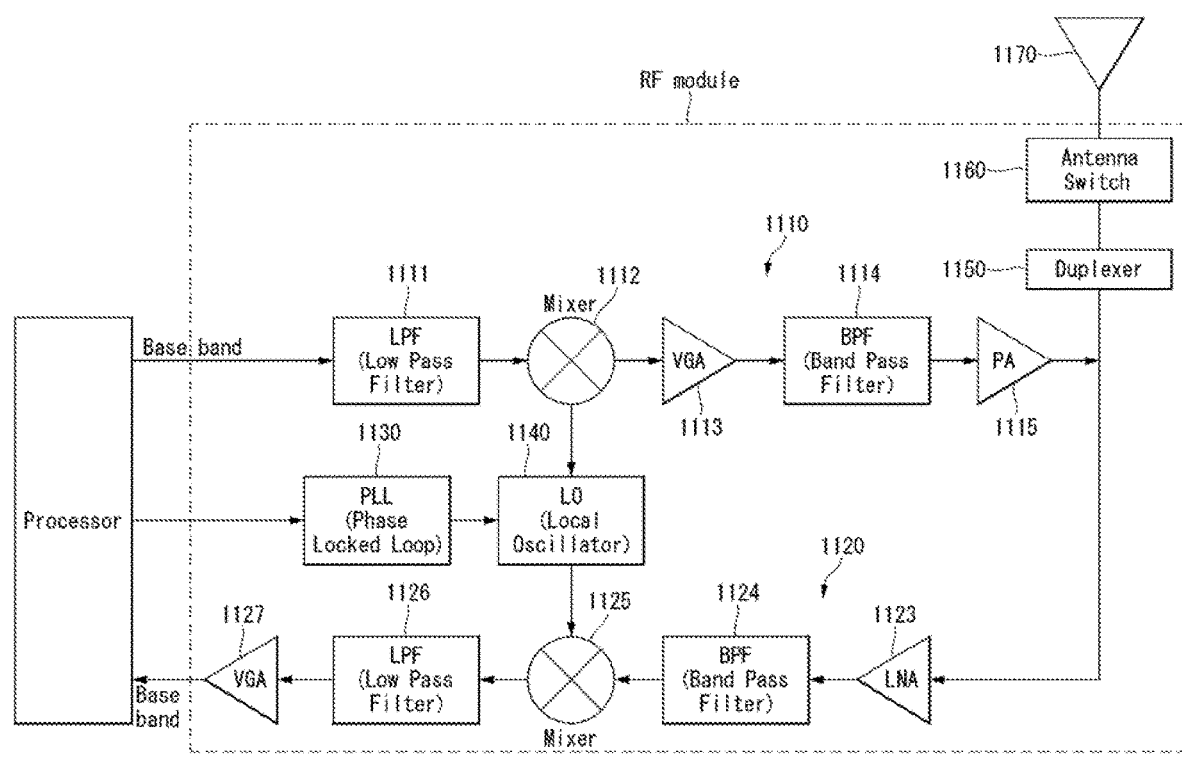

[FIG. 12]
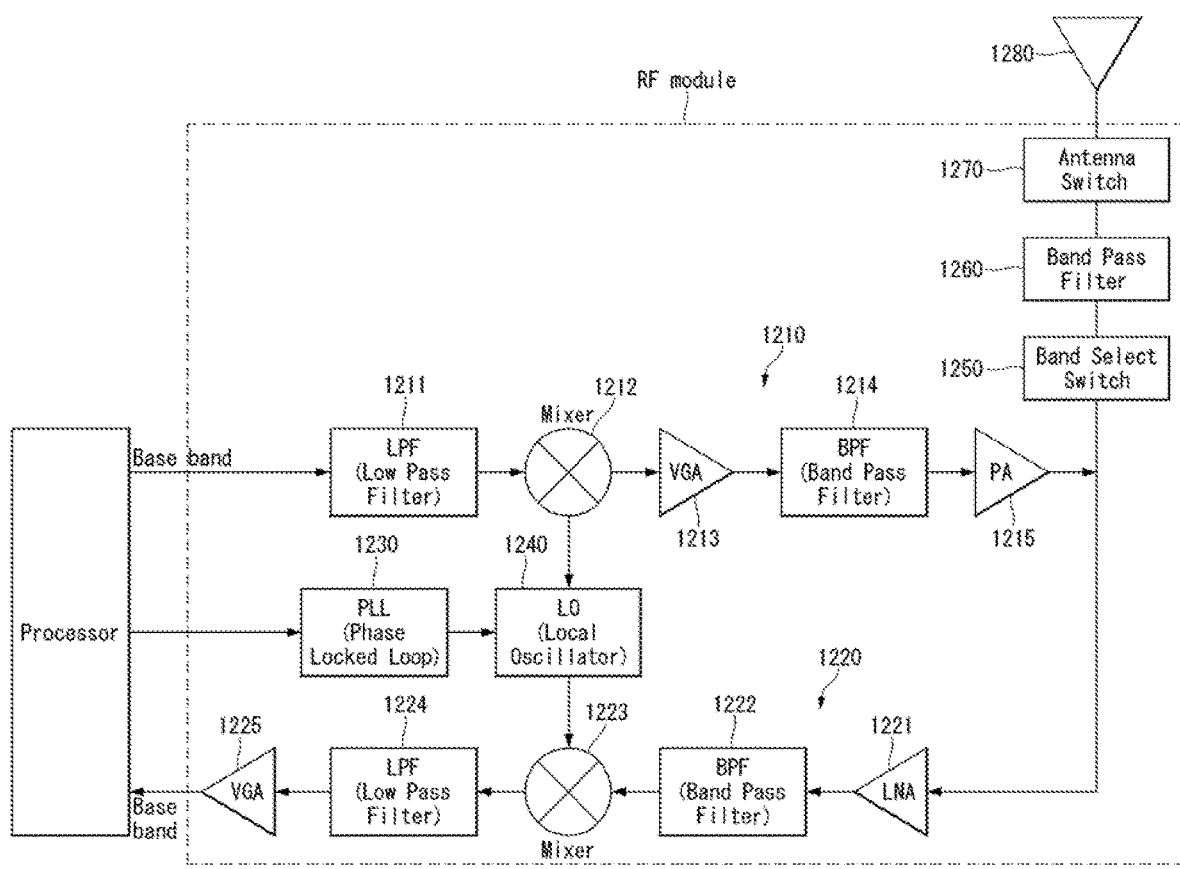

METHOD FOR TRANSMITTING A PRACH PREAMBLE IN A WIRELESS COMMUNICATION AND APPARATUS THEREFOR

CROSS-REFERENCE TO RELATED APPLICATIONS

This application claims the benefit of U.S. Provisional Application No. 62/547,774 filed on Aug. 19, 2017. The contents of this application are hereby incorporated by reference in its entirety.

BACKGROUND OF THE INVENTION

Field of the Invention

The present invention relates to a wireless communication system, and more particularly, to a method for transmitting a physical random access channel (PRACH) preamble and an apparatus for supporting the same.

Related Art

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

SUMMARY OF THE INVENTION

The present invention provides a method for setting a cyclic shift (CS) value related with generation of a PRACH preamble sequence in an NR system that supports various subcarrier spacings (SCSs).

The technical objects of the present invention are not limited to the aforementioned technical objects, and other technical objects, which are not mentioned above, will be apparently appreciated by a person having ordinary skill in the art from the following description.

In an aspect, a method for transmitting a physical random access channel (PRACH) preamble in a wireless communication system is provided. The method includes generating a PRACH preamble sequence having a zero correlation zone (ZCZ) having a specific length based on a specific number-th root Zadoff-Chu sequence and a cyclic shift; and transmitting to a base station the PRACH preamble including the generated PRACH preamble sequence, wherein a value of a cyclic shift size $N_{CS}$ is determined based on a subcarrier spacing (SCS) and a size of a ZCZ configuration set of the PRACH preamble sequence.

The subcarrier spacing may be 5 kHz.

The value of the cyclic shift size $N_{CS}$ may be a value related with an unrestricted set.

When the size of the ZCZ configuration set is 3 bits, an initial cyclic shift size value other than 0 may be set to a cyclic shift size value corresponding to initial maximum cell coverage of a restricted set for a subcarrier spacing of 1.25 kHz.

A last cyclic shift size value may be set to a cyclic shift size value corresponding to a last ZCZ configuration of an unrestricted set of 1.25 kHz.

The initial cyclic shift size value may be 38.
The last cyclic shift size value may be 419.
A length of the PRACH preamble sequence may be 839.
The specific length may be a cyclic shift size $N_{CS}-1$.

In another aspect, a user equipment for transmitting a physical random access channel (PRACH) preamble in a wireless communication system is provided. The user equipment includes a radio frequency (RF) module transmitting and receiving a radio signal; and a processor functionally connected with the RF module, wherein the processor may be configured to generate a PRACH preamble sequence having a zero correlation zone (ZCZ) having a specific length based on a specific number-th root Zadoff-Chu sequence and a cyclic shift, and transmit to a base station the PRACH preamble including the generated PRACH preamble sequence, and a value of a cyclic shift size $N_{CS}$ is determined based on a subcarrier spacing (SCS) and a size of a ZCZ configuration set of the PRACH preamble sequence.

The present invention has an advantage in that a cyclic shift size value is configured based on a subcarrier spacing and a size of a ZCZ configuration to transmit a PRACH preamble in an NR system that supports various SCSs.

Advantages which can be obtained in the present invention are not limited to the aforementioned effects and other unmentioned advantages will be clearly understood by those skilled in the art from the following description.

BRIEF DESCRIPTION OF THE DRAWINGS

In order to help understanding of the present invention, the accompanying drawings which are included as a part of the Detailed Description provide embodiments of the present invention and describe the technical features of the present invention together with the Detailed Description.

FIG. 1 is a diagram illustrating an example of an overall system structure of NR to which a method proposed in this specification may be applied.

FIG. 2 illustrates a relationship between an uplink frame and a downlink frame in a wireless communication system to which the method proposed in this specification may be applied.

FIG. 3 illustrates an example of a resource grid supported in the wireless communication system to which the method proposed in this specification may be applied.

FIG. 4 illustrates one example of a self-contained subframe structure to which the method proposed in this specification may be applied.

FIG. 5 shows a transceiver unit model in a radio communication system to which the present invention may be applied.

FIG. 6 is a diagram illustrating one example of a contention based RACH procedure.

FIG. 7 is a diagram illustrating one example of a random access preamble format.

FIG. 8 is a diagram illustrating an example of a method of operating UE for transmitting a PRACH preamble proposed in this specification.

FIG. 9 illustrates a block diagram of a wireless communication device to which methods proposed in this specification may be applied.

FIG. 10 illustrates a block diagram of a communication device according to an embodiment of the present invention.

FIG. 11 is a diagram illustrating an example of an RF module of the wireless communication device to which the method proposed in this specification may be applied.

FIG. 12 is a diagram illustrating another example of the RF module of the wireless communication device to which the method proposed in this specification may be applied.

DESCRIPTION OF EXEMPLARY EMBODIMENTS

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (Wi-MAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface
General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |

TABLE 1-continued

| μ | Δf = $2^\mu \cdot 15$ [kHz] | Cyclic prefix |
|---|---|---|
| 4 | 240 | Normal |
| 5 | 480 | Normal |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f / 100) \cdot T_s = 10$ ms. The radio frame is composed of ten subframes each having a section of $T_{sf} = (\Delta f_{max} N_f / 1000) \cdot T_s = 1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA} = N_{TA} T_s$ before the start of a corresponding DL frame in the UE.

Regarding the numerology μ, slots are numbered in ascending order of $n_s^\mu \in \{0, \ldots, N_{subframe}^{slots,\mu} - 1\}$ in a subframe, and in ascending order of $n_{s,f}^\mu \in \{0, \ldots, N_{subframe}^{slots,\mu} - 1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | | | Slot configuration | | | |
|---|---|---|---|---|---|---|
| | | 0 | | | 1 | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | | | Slot configuration | | | |
|---|---|---|---|---|---|---|
| | | 0 | | | 1 | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the present disclosure may be implemented.

Referring to FIG. 3, a resource grid is composed of $N_{RB}^{\mu} N_{sc}^{\mu}$ subcarriers in a frequency domain, each subframe composed of $14.2\mu$ OFDM symbols, but the present disclosure is not limited thereto.

In the NR system, a transmitted signal is described by one or more resource grids, composed of $N_{RB}^{\mu} N_{sc}^{\mu}$ subcarriers, and $2^{\mu} N_{symb}^{(\mu)}$ OFDM symbols Herein, $N_{RB}^{\mu} \leq N_{RB}^{max,\mu}$. The above RB indicates the maximum transmission bandwidth, and it may change not just between numerologies, but between UL and DL.

In this case, as illustrated in FIG. 3, one resource grid may be configured for the numerology $\mu$ and an antenna port p.

Each element of the resource grid for the numerology $\mu$ and the antenna port p is indicated as a resource element, and may be uniquely identified by an index pair (k,l). Herein, k=0, ..., $N_{RB}^{\mu} N_{sc}^{\mu}-1$ is an index in the frequency domain, and l=0, ..., $2^{\mu} N_{symb}^{(\mu)}-1$ indicates a location of a symbol in a subframe. To indicate a resource element in a slot, the index pair (k,l), is used. Herein, l=0, ..., $N_{symb}^{\mu}-1$.

The resource element (k,l) for the numerology $\mu$ and the antenna port p corresponds to a complex value $a_{k,l}^{(p,\mu)}$. When there is no risk of confusion or when a specific antenna port or numerology is specified, the indexes p and $\mu$ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

FIG. 4 is a diagram illustrating an example of a self-contained subframe structure in a wireless communication system to which the present disclosure may be implemented.

In order to minimize data transmission latency in a TDD system, 5G new RAT considers a self-contained subframe structure as shown in FIG. 4.

In FIG. 4, a diagonal line area (symbol index 0) represents a UL control area, and a black area (symbol index 13) represents a UL control area. A non0shade area may be used for DL data transmission or for UL data transmission. This structure is characterized in that DL transmission and UL transmission are performed sequentially in one subframe and therefore transmission of DL data and reception of UL ACK/NACK may be performed in the subframe. In conclusion, it is possible to reduce time for retransmitting data upon occurrence of a data transmission error and thereby minimize a latency of final data transmission.

In this self-contained subframe structure, a time gap is necessary for a base station or a UE to switch from a transmission mode to a reception mode or to switch from the reception mode to the transmission mode. To this end, some OFDM symbols at a point in time of switching from DL to UL in the self-contained subframe structure are configured as a guard period (GP).

Analog Beamforming

Since a wavelength is short in a Millimeter Wave (mmW) range, a plurality of antenna elements may be installed in the same size of area. That is, a wavelength in the frequency band 30 GHz is 1 cm, and thus, 64 (8×8) antenna elements may be installed in two-dimensional arrangement with a 0.5 lambda (that is, a wavelength) in 4×4 (4 by 4) cm panel. Therefore, in the mmW range, the coverage may be enhanced or a throughput may be increased by increasing a beamforming (BF) gain with a plurality of antenna elements.

In this case, in order to enable adjusting transmission power and phase for each antenna element, if a transceiver unit (TXRU) is included, independent beamforming for each frequency resource is possible. However, it is not cost-efficient to install TXRU at each of about 100 antenna elements. Thus, a method is considered in which a plurality of antenna elements is mapped to one TXRU and a direction of beam is adjusted with an analog phase shifter. Such an analog BF method is able to make only one beam direction over the entire frequency band, and there is a disadvantage that frequency-selective BF is not allowed.

A hybrid BF may be considered which is an intermediate between digital BF and analog BF, and which has B number of TXRU less than Q number of antenna elements. In this case, although varying depending upon a method of connecting B number of TXRU and Q number of antenna elements, beam directions capable of being transmitted at the same time is restricted to be less than B.

Hereinafter, typical examples of a method of connecting TXRU and antenna elements will be described with reference to drawings.

FIG. 5 is an example of a transceiver unit model in a wireless communication system to which the present disclosure may be implemented.

A TXRU virtualization model represents a relationship between output signals from TXRUs and output signals from antenna elements. Depending on a relationship between antenna elements and TXRUs, the TXRU virtualization model may be classified as a TXRU virtualization model option-1: sub-array partition model, as shown in FIG. 5(a), or as a TXRU virtualization model option-2: full-connection model.

Referring to FIG. 5(a), in the sub-array partition model, the antenna elements are divided into multiple antenna element groups, and each TXRU may be connected to one of the multiple antenna element groups. In this case, the antenna elements are connected to only one TXRU.

Referring to FIG. 5(b), in the full-connection model, signals from multiple TXRUs are combined and transmitted to a single antenna element (or arrangement of antenna elements). That is, this shows a method in which a TXRU is connected to all antenna elements. In this case, the antenna elements are connected to all the TXRUs.

In FIG. 5, q represents a transmitted signal vector of antenna elements having M number of co-polarized in one column. W represents a wideband TXRU virtualization weight vector, and W represents a phase vector to be multiplied by an analog phase shifter. That is, a direction of analog beamforming is decided by W. x represents a signal vector of M_TXRU number of TXRUs.

Herein, mapping of the antenna ports and TXRUs may be performed on the basis of 1-to-1 or 1-to-many.

TXRU-to-element mapping In FIG. 5 is merely an example, and the present disclosure is not limited thereto and may be equivalently applied even to mapping of TXRUs and antenna elements which can be implemented in a variety of hardware forms.

Frequency, Time and Frame Synchronization

In order for UE to communicate with a base station, synchronization between the UE and the base station needs to be performed first.

In an LTE system, downlink synchronization is achieved through a synchronization channel.

At this time, synchronization information is transmitted to all UEs within a cell radius through a broadcast channel, and the UE that has acquired the corresponding information proceeds a synchronization procedure with the base station.

The downlink synchronization procedure will be described through an example of an LTE synchronization procedure as follows.

LTE Synchronization Procedure

First, a primary synchronization signal (PSS) is used for symbol timing acquisition, frequency synchronization, and cell ID detection within a cell ID group (3 hypotheses).

In addition, a secondary synchronization signal (SSS) is used for cell ID group detection (168 hypotheses), 10-ms frame boundary detection, and CP detection (2 hypotheses).

In addition, physical broadcast channel (PBCH) decoding is used for antenna configuration, 40 ms timing detection, system information, and transmission of system bandwidth.

That is, the UE acquires OFDM symbol timing and subframe timing through the PSS and the SSS and acquires a cell ID.

Then, the UE descrambles and decodes the PBCH using the acquired cell ID to acquire important information provided by the corresponding system.

Next, in the case of the uplink, the synchronization is temporarily set only when data transmission to the uplink of the UE is required in order to prevent indiscriminate use of resources for synchronization.

At this time, a channel used for uplink synchronization is defined as a random access channel (RACH).

A block including the uplink synchronization signal and the downlink broadcast channel including the configuration information for the RACH resource is called an SS block.

Next, an RACH procedure will be described.

The RACH is used when the connection between the UE and the base station is disconnected or when communication with the initial base station is required.

RACH-related scenarios are divided into the following five categories.

If the state of the UE is RRC_Connected but not synchronized, it is necessary to transmit new data or related control information If the state of the UE is RRC_Connected but not synchronized, it is necessary to receive new data and transmit response information ACK/NACK thereon If the state of the UE is RRC_Connected and transition to a neighboring cell from a currently served cell is required If the state transition from an RRC_Idle state to an RRC_Connected state is required If connection with the base station is disconnected and recovering is required When the RACH procedure is performed in the above situation, the RACH procedure may be largely classified into two types and procedures.

The RACH procedure is divided into a contention-based procedure in which all UEs to be synchronized transmit a randomly selected PRACH preamble signal to a base station using allocated resources, and a contention-free procedure to dynamically allocate a specific resource to a designated UE. The contention-based RACH procedure in the LTE is schematized as follows.

In the contention-based procedure, there is a probability of collision of signals between UEs, and in the contention-free procedure, there is no probability of collision of signals between UEs.

FIG. 6 is a diagram illustrating an example of a contention-based RACH procedure.

The UE receives and stores information on the random access from the base station through the system information. Thereafter, when the random access is required, the UE transmits a random access preamble (also referred to as message 1) to the base station.

When the base station receives the random access preamble from the UE, the base station transmits a random access response message (also referred to as message 2) to the UE.

Specifically, downlink scheduling information for the random access response message may be CRC-masked with a random access-radio network temporary identifier (RA-RNTI) and transmitted on an L1 or L2 control channel (PDCCH). The UE receiving the downlink scheduling signal masked with the RA-RNTI may receive and decode the random access response message from a physical downlink shared channel (PDSCH).

Thereafter, the UE checks whether the random access response information indicated to the UE exists in the random access response message.

Whether there is the random access response information indicated to the UE may be checked by whether there is a random access preamble ID (RAID) for the preamble transmitted by the UE.

The random access response information includes timing alignment (TA) indicating timing offset information for synchronization, radio resource allocation information used for uplink, a temporary ID (e.g., temporary C-RNTI) for UE identification, and the like.

When the UE receives the random access response information, the UE performs uplink transmission (also expressed as message 3) to an uplink shared channel (S-SCH) according to the radio resource allocation information included in the response information. Here, the uplink transmission may be expressed as scheduled transmission.

After the base station receives the uplink transmission from the UE, the base station transmits a message (also expressed as message 4) for contention resolution to the UE through a downlink shared channel (DL-SCH).

Next, a PRACH preamble format will be described.

FIG. 7 is a diagram illustrating an example of a random access preamble format.

That is, FIG. 7 is a RACH preamble format which is using in a conventional LTE system, and the RACH preamble includes a cyclic prefix (CP) and a sequence.

Specifically, the length of a sequence is defined by establishing a trade off relation between length and overhead and considering a maximum expected round-trip delay, compatibility with the DATA channel, and the radius of the base station.

In addition, the CP is configured to protect the interference to the UE adjacent to the cell radius in consideration of a given maximum delay spread.

Currently, a new RAT system uses a short wavelength carrier, and unlike conventional LTE, a short preamble sequence length is considered.

If the length of the sequence is shortened, the detection performance is reduced or the radius of the base station is shortened, and thus, to this end, a method of transmitting repeatedly the same sequence is considered.

Accordingly, in this case, an efficient use method of time resources required for preamble transmission and form configuration are required.

Next, a cyclic shift associated with RACH preamble sequence generation will be described.

In the case of a Zadoff-Chu (ZC) sequence used in the preamble sequence, a preamble sequence related to a root index u is defined as shown in Equation 2 below.

$$x_u(n) = e^{-j\frac{\pi u n(n+1)}{N_{ZC}}}, 0 \leq n \leq N_{ZC} - 1 \quad \text{[Equation 2]}$$

In Equation 2, $N_{ZC}$ represents the length of the Zadoff-Chu (ZC) sequence.

Sequences generated in the same root index have orthogonal characteristics among the sequences and thus has a zero value at the time of cross correlation.

On the other hand, sequences generated at different root indexes have non-orthogonal characteristics.

Therefore, a cyclic shift exists in order to define the shifted sequence within the same root index, and depending on how the value is set, efficient resource utilization is possible and detection performance may also be improved.

That is, a parameter $N_{CS}$ indicating a cyclic shift size is designed for a zero correlation zone (ZCZ), which guarantees the aforementioned orthogonality regardless of the delay spread and the timing uncertainty of the UE.

The zero correlation zones ($N_{CS}-1$) of the u-th root ZC sequence are defined as Equation 3 below.

$$x_{u,v}(n) = x_u((n+C_v) \bmod N_{ZC}) \quad \text{[Equation 3]}$$

In Equation 3, the cyclic shift $C_v$ is defined as Equation 4 below.

$$C_v = vN_{CS}, v=0,1,\ldots,\lfloor N_{ZC}/N_{CS}\rfloor-1, N_{CS} \neq 0 \quad \text{[Equation 4]}$$

Here, the lower bound of the cyclic shift size ($N_{CS}$) is expressed as Equation 5 below.

$$N_{CS}\left(\frac{T_{SEQ}}{N_{ZC}}\right) \geq \text{Round trip delay} + \text{maximum delay spread} \quad \text{[Equation 5]}$$

In Equation 5, $T_{SEQ}$ denotes the duration of the RACH preamble.

An NR system supports multiple SCS (1.25/5/15/30/60/120 kHz) and supports a multiple sequence length unlike LTE which uses single subcarrier-spacing (SCS) at 1.25 kHz for RACH transmission.

Therefore, a maximum supported cell radius is changed according to the sequence length and the SCS, and the cyclic shift size within the defined cell radius needs to be small enough to generate as many orthogonal sequences as possible for each cell.

Information on the cyclic shift size is broadcasted from the base station to the UE and used as information required for generating the RACH preamble sequence.

Hereinafter, a method for configuring a cyclic shift (CS) corresponding to an important parameter used in generating a short (PRACH) preamble sequence in the NR system proposed in this specification will be described.

The physical random access channel (PRACH) preamble of the NR system supports a 1.25 kHz subcarrier spacing (SCS) used in the existing LTE system and simultaneously uses 5 kHz SCS which is four times larger than the related art in order to reduce the effect of the doppler spread generated according to the movement of the UE.

That is, in this specification, with respect to the corresponding 5-kHz SCS, a cyclic shift set used for generating the PRACH preamble sequence for is defined.

Table 4 shows examples of a cyclic shift value for generating the PRACH preamble used in the existing LTE system and a maximum cell coverage corresponding to the corresponding value.

Here, an Ncs value is a parameter indicating the size of the cyclic shift.

TABLE 4

| | Sequence length: 839/SCS: 1.25 kHz | | | |
|---|---|---|---|---|
| Zerocorrelation ZoneConfig | Unrestricted (Ncs) | Max.cell (km) | Restricted (Ncs) | Max.cell (km) |
| 0 | 0 | 0 | 15 | 1.08 |
| 1 | 13 | 0.79 | 18 | 1.51 |
| 2 | 15 | 1.08 | 22 | 2.08 |
| 3 | 18 | 1.51 | 26 | 2.65 |
| 4 | 22 | 2.08 | 32 | 3.51 |
| 5 | 26 | 2.65 | 38 | 4.37 |
| 6 | 32 | 3.51 | 46 | 5.51 |
| 7 | 38 | 4.37 | 55 | 6.8 |
| 8 | 46 | 5.51 | 68 | 8.66 |
| 9 | 59 | 7.37 | 82 | 10.66 |
| 10 | 76 | 9.8 | 100 | 13.24 |
| 11 | 93 | 12.24 | 128 | 17.24 |
| 12 | 119 | 15.95 | 158 | 21.53 |
| 13 | 167 | 22.82 | 202 | 27.83 |
| 14 | 279 | 38.84 | 237 | 32.83 |
| 15 | 419 | 58.86 | | |

When the SCS of the PRACH preamble sequence is 5 kHz, the duration of the PRACH preamble sequence is reduced to ¼ (200 ms) compared to the related art, but there is no change in the length of the sequence.

Therefore, the cyclic shift value used for generating the PRACH preamble sequence proposed in this specification (NR system) may be used as the cyclic shift value of the LTE system as it is, and with respect to an unrestricted set for a normal speed, a quantized cyclic shift set is defined according to the number of bits representing the cyclic shift.

If the length of the PRACH preamble sequence is '839', 10 bits are required to express Ncs (cyclic shift) to have full flexibility.

However, this may cause signaling overhead.

Therefore, the cyclic shift value needs to be configured with a quantized set.

As shown in Table 4, in the existing LTE system, the cyclic shift set is divided into 16 levels using 4 bits and each cyclic shift value is defined.

In the method proposed in this specification, with respect to the cyclic shift set used in the generation of the preamble sequence (5-kHz SCS), the size of the cyclic shift used in the existing LTE is used as it is, but the quantized cyclic shift sets are defined according to the given information quantity bit number.

A method for configuring the cyclic shift value used in the PRACH preamble sequence generation proposed in this specification will be described in more detail with reference to the related table.

That is, methods of configuring (or setting) a cyclic shift value according to the size of a zero correlation zone (ZCZ) configuration set will be described.

First, referring to Table 5, a case in which the size of the ZCZ configuration set is 4 bits will be described.

That is, Table 5 is a table showing a cyclic shift size value (or an Ncs value) when the size of the ZCZ configuration set (or the cyclic shift set) is 4 bits.

The configuration of the cyclic shift value proposed in this specification is to use the whole or a part of the cyclic shift value without changing the value of the ZCZ configuration set in the existing LTE system in order to reduce the implementation complexity of the UE.

Therefore, when the size of the ZCZ configuration set is 4 bits, the existing cyclic shift value may be used as it is as shown in Table 5.

TABLE 5

| Zerocorrelation ZoneConfig | Sequence length: 839/SCS: 5 kHz | |
|---|---|---|
| | Unrestricted (Ncs) | Max.cell (km) |
| 0 | 0 | — |
| 1 | 13 | 0.2 |
| 2 | 15 | 0.27 |
| 3 | 18 | 0.38 |
| 4 | 22 | 0.52 |
| 5 | 26 | 0.66 |
| 6 | 32 | 0.88 |
| 7 | 38 | 1.09 |
| 8 | 46 | 1.38 |
| 9 | 59 | 1.84 |
| 10 | 76 | 2.45 |
| 11 | 93 | 3.06 |
| 12 | 119 | 3.99 |
| 13 | 167 | 5.7 |
| 14 | 279 | 9.71 |
| 15 | 419 | 14.72 |

First, referring to Table 6, a case in which the size of the ZCZ configuration set is 3 bits will be described.

As described above, if the duration of the PRACH preamble sequence is reduced to ¼, the maximum cell coverage becomes smaller.

In this case, a very small radius such as 0.2 km and 0.27 km occurs, and allocating the ZCZ configuration for such cell coverage may result in a waste of bit number.

Therefore, to solve this problem, it is necessary to define a ZCZ configuration set that is quantized to 8 levels instead of 16 levels.

If the size of the ZCZ configuration set is defined as 3 bits, the configuration for the cyclic shift set proposed in this specification may be as shown in Table 6.

TABLE 6

| Zerocorrelation ZoneConfig | Sequence length: 839/SCS: 5 kHz | |
|---|---|---|
| | Unrestricted (Ncs) | Max.cell (km) |
| 0 | 0 | — |
| 1 | 38 | 1.09 |
| 2 | 46 | 1.38 |
| 3 | 59 | 1.84 |
| 4 | 76 | 2.45 |
| 5 | 93 | 3.06 |
| 6 | 119 | 3.99 |
| 7 | 419 | 14.72 |

In Table 6, the reason why the value of the initial cyclic shift (corresponding to ZCZ configuration #1) of an unrestricted set is set to '38' is associated with the reason why the 5 kHz SCS is introduced in the NR system.

That is, the reason why the PRACH preamble of 5 kHz SCS is introduced is for a high speed case.

Thus, to support the same cell coverage as the initial maximum cell coverage 1.08 km (see Table 4) of a restricted set of 1.25 kHz SCS, the initial cyclic shift value in the unrestricted set (in Table 6) is defined as '38'.

The reason why the last value (ZCZ configuration #7) of the ZCZ configuration set is set to '419' is associated to a cyclic prefix (CP) length of the RACH preamble.

Since the maximum supportable cell radius through the CP length is 14.68 km, the cyclic shift value of the (unrestricted set) corresponding to the last value of the ZCZ configuration is '419' in order to support this.

In the case of five ZCZ configurations other than ZCZ configurations 0, 1 and 7 (of Table 6), Ncs values 46, 59, 76, 93, and 119 for five ZCZ configurations #8, #9, #10, #11, and #12 below an Ncs value 38 of the ZCZ configuration #7 of Table 5 are configured as ZCZ configurations #2, #3, #4, #5, and #6 (of Table 6).

This is to generate a lot of orthogonal preamble within one root Zadoff-Chu sequence.

FIG. 8 is a diagram illustrating an example of a method of operating UE for transmitting a PRACH preamble proposed in this specification.

First, the UE generates a PRACH preamble sequence having a zero correlation zone (ZCZ) of a specific length based on a specific number-th root Zadoff-Chu sequence and a cyclic shift (S810).

Here, the length of the PRACH preamble sequence may be 839, and the specific length may be a cyclic shift size ($N_{CS}$)−1.

Then, the UE transmits the PRACH preamble including the generated PRACH preamble sequence to the base station (S820).

Here, the value of the cyclic shift size $N_{CS}$ may be determined based on a subcarrier spacing (SCS) of the PRACH preamble sequence and a size of the ZCZ configuration set.

The subcarrier interval may be 5 kHz, and the value of the cyclic shift size $N_{CS}$ may be a value associated with an unrestricted set.

If the size of the ZCZ configuration set is 3 bits, the non-zero initial cyclic shift size value may be set to a cyclic shift size corresponding to the initial maximum cell coverage of a restricted set for a subcarrier interval of 1.25 kHz.

In addition, the last cyclic shift size value may be set to a cyclic shift size value corresponding to the last ZCZ configuration of an unrestricted set of 1.25 kHz.

For example, the initial cyclic shift size value may be 38, and the last cyclic shift size value may be 419.

Overview of Devices to which Present Invention is Applicable

FIG. 9 illustrates a block diagram of a wireless communication device to which methods proposed in this specification may be applied.

Referring to FIG. 9, a wireless communication system includes a base station 910 and multiple user equipments 920 positioned within an area of the base station.

Each of the BS and the UE may be expressed as a wireless device.

The BS includes a processor 911, a memory 912, and a radio frequency (RF) module 913. The processor 911 implements a function, a process, and/or a method which are proposed in FIGS. 1 to 8 above. Layers of a radio interface protocol may be implemented by the processor. The memory is connected with the processor to store various information for driving the processor. The RF module is connected with the processor to transmit and/or receive a radio signal.

The UE includes a processor 921, a memory 922, and an RF module 923.

The processor implements a function, a process, and/or a method which are proposed in FIGS. 1 to 8 above. Layers of a radio interface protocol may be implemented by the processor. The memory is connected with the processor to store various information for driving the processor. The RF module is connected with the processor to transmit and/or receive a radio signal.

The memories 912 and 922 may be positioned inside or outside the processors 911 and 921 and connected with the processor by various well-known means.

Further, the base station and/or the UE may have a single antenna or multiple antennas.

The antennas 914 and 924 function to transmit and receive the radio signals.

FIG. 10 illustrates a block diagram of a communication device according to an embodiment of the present invention.

In particular, FIG. 10 is a diagram more specifically illustrating the UE of FIG. 9 above.

Referring to FIG. 10, the UE may be configured to include a processor (or a digital signal processor (DSP) 1010, an RF module (or RF unit) 1035, a power management module 1005, an antenna 1040, a battery 1055, a display 1015, a keypad 1020, a memory 1030, a subscriber identification module (SIM) card 1025 (This component is optional), a speaker 1045, and a microphone 1050. The UE may also include a single antenna or multiple antennas.

The processor 1010 implements a function, a process, and/or a method which are proposed in FIGS. 1 to 8 above. Layers of a radio interface protocol may be implemented by the processor.

The memory 1030 is connected with the processor and stores information related with an operation of the processor. The memory may be positioned inside or outside the processor and connected with the processor by various well-known means.

A user inputs command information such as a telephone number or the like by, for example, pressing (or touching) a button on the keypad 1020 or by voice activation using the microphone 1050. The processor receives such command information and processes to perform appropriate functions including dialing a telephone number. Operational data may be extracted from the SIM card 1025 or the memory 1030.

In addition, the processor may display command information or drive information on the display 1015 for the user to recognize and for convenience.

The RF module 1035 is connected with the processor to transmit and/or receive an RF signal. The processor transfers the command information to the RF module to initiate communication, for example, to transmit radio signals constituting voice communication data. The RF module is constituted by a receiver and a transmitter for receiving and transmitting the radio signals. The antenna 1040 functions to transmit and receive the radio signals. Upon receiving the radio signals, the RF module may transfer the signal for processing by the processor and convert the signal to a baseband. The processed signal may be converted into to audible or readable information output via the speaker 1045.

FIG. 11 is a diagram illustrating an example of an RF module of the wireless communication device to which the method proposed in this specification may be applied.

Specifically, FIG. 11 illustrates an example of an RF module that may be implemented in a frequency division duplex (FDD) system.

First, in a transmission path, the processors described in FIGS. 9 and 10 process the data to be transmitted and provide an analog output signal to the transmitter 1110.

Within the transmitter 1110, the analog output signal is filtered by a low pass filter (LPF) 1111 to remove images caused by a digital-to-analog conversion (ADC) and up-converted to an RF from a baseband by an up-converter (mixer) 1112, and amplified by a variable gain amplifier (VGA) 1113 and the amplified signal is filtered by a filter 1114, additionally amplified by a power amplifier (PA) 1115, routed through a duplexer(s) 1150/an antenna switch(es) 1160, and transmitted through an antenna 1170.

In addition, in a reception path, the antenna receives signals from the outside and provides the received signals, which are routed through the antenna switch(es) 1160/ duplexers 1150 and provided to a receiver 1120.

In the receiver 1120, the received signals are amplified by a low noise amplifier (LNA) 1123, filtered by a bans pass filter 1124, and down-converted from the RF to the baseband by a down-converter (mixer) 1125.

The down-converted signal is filtered by a low pass filter (LPF) 1126 and amplified by a VGA 1127 to obtain an analog input signal, which is provided to the processors described in FIGS. 9 and 10.

Further, a local oscillator (LO) generator 1140 also provides transmitted and received LO signals to the up-converter 1112 and the down-converter 1125, respectively.

In addition, a phase locked loop (PLL) 1130 receives control information from the processor to generate the transmitted and received LO signals at appropriate frequencies and provides control signals to the LO generator 1140.

Further, circuits illustrated in FIG. 11 may be arranged differently from the components illustrated in FIG. 11.

FIG. 12 is a diagram illustrating another example of the RF module of the wireless communication device to which the method proposed in this specification may be applied.

Specifically, FIG. 12 illustrates an example of an RF module that may be implemented in a time division duplex (TDD) system.

A transmitter 1210 and a receiver 1220 of the RF module in the TDD system are identical in structure to the transmitter and the receiver of the RF module in the FDD system.

Hereinafter, only the structure of the RF module of the TDD system that differs from the RF module of the FDD system will be described and the same structure will be described with reference to a description of FIG. 11.

A signal amplified by a power amplifier (PA) 1215 of the transmitter is routed through a band select switch 1250, a band pass filter (BPF) 1260, and an antenna switch(es) 1270 and transmitted via an antenna 1280.

In addition, in a reception path, the antenna receives signals from the outside and provides the received signals, which are routed through the antenna switch(es) 1260, the band pass filter 1250, and the band select switch 1550 and provided to the receiver 1220.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

Although a scheme of transmitting a PRACH preamble in a wireless communication system of the present invention has been described with reference to an example applied to a 3GPP LTE/LTE-A system or a 5G system (New RAT system), the scheme may be applied to various wireless communication systems in addition to the 3GPP LTE/LTE-A system or 5G system.

What is claimed is:

1. A method for transmitting a physical random access channel (PRACH) preamble in a wireless communication system, the method comprising:
   generating a PRACH preamble sequence having a zero correlation zone (ZCZ) having a specific length based on a specific number-th root Zadoff-Chu sequence and a cyclic shift; and
   transmitting to a base station the PRACH preamble including the generated PRACH preamble sequence,
   wherein a value of a cyclic shift size $N_{CS}$ is determined based on a subcarrier spacing (SCS) and a bit-width of a ZCZ configuration set of the PRACH preamble sequence, and
   wherein the SCS is 5 kHz.

2. The method of claim 1, wherein the value of the cyclic shift size $N_{CS}$ is a value related with an unrestricted set.

3. The method of claim 2, wherein when the bit-width of the ZCZ configuration set is 3 bits, an initial cyclic shift size value other than 0 is set to a cyclic shift size value corresponding to initial maximum cell coverage of a restricted set for a subcarrier spacing of 1.25 kHz.

4. The method of claim 3, wherein a last cyclic shift size value is set to a cyclic shift size value corresponding to a last ZCZ configuration of an unrestricted set of 1.25 kHz.

5. The method of claim 3, wherein the initial cyclic shift size value is 38.

6. The method of claim 4, wherein the last cyclic shift size value is 419.

7. The method of claim 1, wherein a length of the PRACH preamble sequence is 839.

8. The method of claim 1, wherein the specific length is cyclic shift size $N_{CS}-1$.

9. A user equipment for transmitting a physical random access channel (PRACH) preamble in a wireless communication system, the user equipment comprising:
   a radio frequency (RF) module including a transceiver transmitting and receiving a radio signal; and
   a processor functionally connected with the RF module, wherein the processor is configured to
   generate a PRACH preamble sequence having a zero correlation zone (ZCZ) having a specific length based on a specific number-th root Zadoff-Chu sequence and a cyclic shift, and
   transmit to a base station the PRACH preamble including the generated PRACH preamble sequence, and
   wherein a value of a cyclic shift size $N_{CS}$ is determined based on a subcarrier spacing (SCS) and a bit-width of a ZCZ configuration set of the PRACH preamble sequence, and
   wherein the SCS is 5 kHz.

* * * * *